United States Patent [19]
Penant

[11] Patent Number: 5,074,345
[45] Date of Patent: Dec. 24, 1991

[54] STEEL CORD CONSISTING OF AN ASSEMBLY OF CONCENTRIC LAYERS OF FILAMENTS, EACH LAYER HAVING SPECIFIED RADIUS AND TWIST PITCH

[75] Inventor: Christophe Penant, Chateaugay, France

........................ 152/451; 57/230; 57/902; 152/556; 428/379

[58] Field of Search .................... 152/451, 527, 556; 57/902, 230–232, 237, 241; 428/379

[56] References Cited

U.S. PATENT DOCUMENTS

| | | | |
|---|---|---|---|
| 2,492,352 | 12/1949 | Bourdon | 152/556 |
| 3,601,970 | 8/1971 | Roberts et al. | |
| 3,776,293 | 12/1973 | Marzocchi | 152/359 |
| 4,488,587 | 12/1984 | Umezawa et al. | 152/539 |
| 4,651,514 | 3/1987 | Collett | |
| 4,660,364 | 4/1987 | Chiang | |
| 4,777,789 | 10/1988 | Kolmes et al. | |
| 4,781,016 | 11/1988 | Sato et al. | 57/213 |

FOREIGN PATENT DOCUMENTS

| | | |
|---|---|---|
| 0133205 | 2/1985 | European Pat. Off. |
| 1361703 | 4/1964 | France |
| 1045576 | 10/1966 | United Kingdom |
| 2018323 | 10/1979 | United Kingdom |

Primary Examiner—Michael W. Ball
Assistant Examiner—Adrienne C. Johnstone
Attorney, Agent or Firm—Brumbaugh, Graves, Donohue & Raymond

[57] ABSTRACT

An assembly (100) for the reinforcing of an article of plastic and/or rubber, characterized by the following features:
  (a) it comprises two adjacent concentric layers (1, 2) of filaments (10, 20), the filaments (10, 20) having their axis ($O_1$, $O_2$) arranged, within each of the layers, substantially on a circle ($C_1$, $C_2$) of radius $R_1$, $R_2$; in each layer (1, 2) the filaments (10, 20) are wound in the same direction and have the same pitch ($P_1$, $P_2$);
  (b) the layers (1, 2) have the same direction of winding;
  (c) $R_1$, $R_2$, $P_1$, $P_2$ are in accord with the relationship:

$$P_1 > P_2 > P_1 \times [1 - 2(R_2 - R_1)/R_2].$$

Articles reinforced by such assemblies, for instance pneumatic tires.

6 Claims, 1 Drawing Sheet

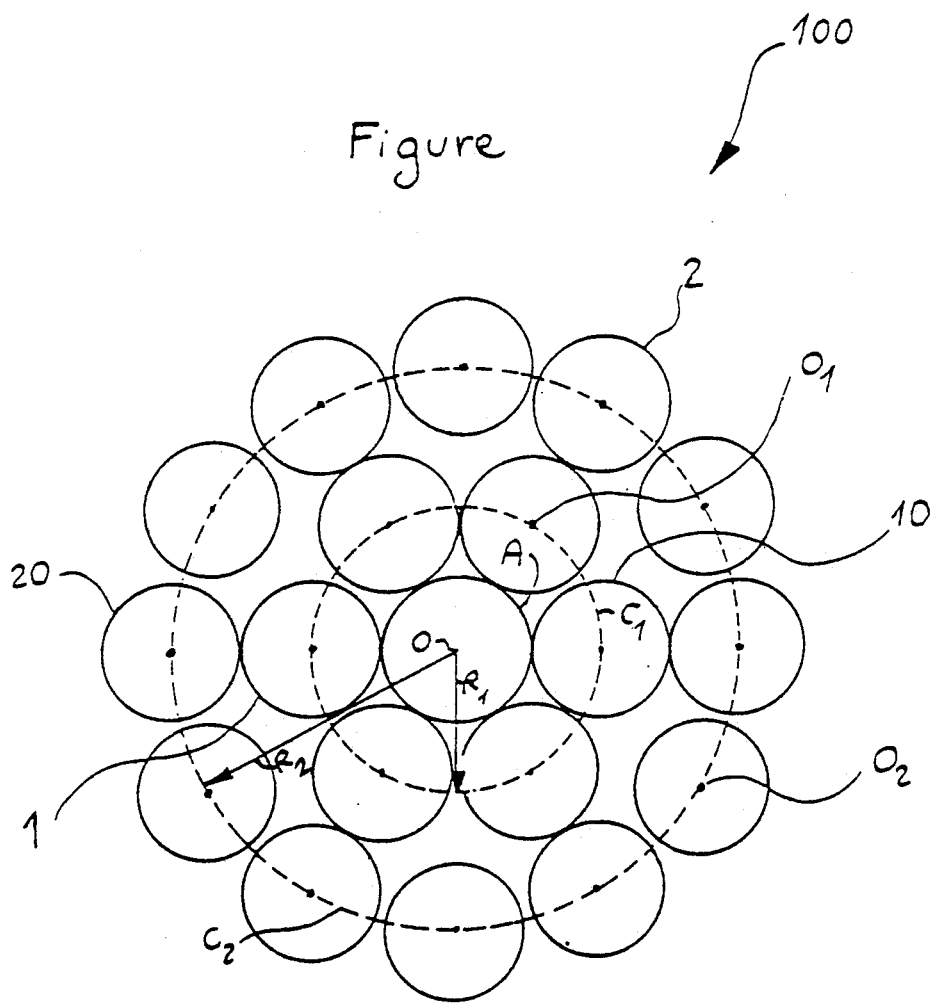

STEEL CORD CONSISTING OF AN ASSEMBLY OF CONCENTRIC LAYERS OF FILAMENTS, EACH LAYER HAVING SPECIFIED RADIUS AND TWIST PITCH

The present invention relates to assemblies of filaments, in particular metal wires, used to reinforce plastic and/or rubber material.

Such reinforcement assemblies are used to produce articles, such as reinforcing plies, belts, tubes and pneumatic tires.

The invention relates in particular to assemblies which comprise at least two concentric layers of filaments, each layer being an assembly of filaments wound in a helix in the same direction with the same pitch and the same radius of lay which corresponds to the radius of the layer. Two of these layers are said to be adjacent if the filaments of one layer are in contact with those of the other layer.

The terms filaments as used herein includes filaments of organic and/or inorganic material and particularly metal wires.

Experience teaches that when such layer assemblies are subjected, for the functioning of the article which they reinforce, to numerous and intense tensile stresses and numerous intensive variations in curvature, fatigue and wear take place within the assembly, in particular as a result of the contact between adjacent layers.

This internal fatigue expresses itself by the breaking of filaments.

This internal wear, in its turn, takes place in the zones of contact between the filaments as a result of the contact pressures and relative movements between these filaments. It may be quantified by measurement of the reduction in the breaking force of filaments taken from homologous assemblies coming from new reinforced articles on the one hand, and from articles which have been subjected to a given amount of use on the other hand.

The object of the invention is to provide an assembly of layers in which the pitches and directions of winding of the adjacent layers are defined by new relationships which make it possible considerably to reduce the internal fatigue and wear of the assembly for a given reinforcement and given use of the reinforced article.

Therefore, the invention concerns an assembly of filaments for reinforcing an article of plastic and/or rubber, this assembly, which comprises at least two layers of filaments, being characterized by the following features:

(a) it comprises at least two adjacent concentric layers of filaments around a common axis, each layer comprising at least two filaments the one of two adjacent layers which is closer to said axis being referred to as "i" and the one of two adjacent layers which is further from the axis being referred to as "j"; in a plane section perpendicular to this axis the filaments in each of these two layers have their axes arranged practically on a circle, the radii of these circles being designated $R_i$ in the case of the layer "i" and $R_j$ in the case of the layer "j"; in each of these two layers, the filaments are wound in the same direction and with the same pitch, these pitches being indicated, respectively, as $P_i$ in the case of the layer "i" and $P_j$ in the case of the layer "j";

(b) the layers "i" and "j" have the same direction of winding;

(c) $R_i$, $R_j$, $P_i$, $P_j$ satisfy the relationship: $P_i > P_j > P_i \times [1 - 2(R_j - R_i)/R_j]$ $R_i$, $R_j$, $P_i$, $P_j$ being expressed in the same unit of length.

Preferably the relationship $P_j = P_i \times (R_i/R_j)$ is substantially satisfied.

The invention also concerns complex assemblies comprising at least two assemblies of filaments, at least one of which is in accord with the above definition.

The invention also concerns articles reinforced by the assemblies or complex assemblies according to the invention, these articles being, in particular, reinforcing plies, belts, tubes and pneumatic tires.

BRIEF DESCRIPTION OF THE DRAWING

The invention will easily be understood by reference to the nonlimitative example which follows and the diagrammatic figure referring to this example which represents a section through an assembly in accordance with the invention.

The assembly 100 shown in this figure is a strand formed of nineteen filaments. One of these filaments, marked A, serves as core, the axis of this filament, represented by 0 in the figure, being the axis of the assembly 100, the figure being a section perpendicular to this axis 0 which is assumed linear. The other filaments are arranged along two adjacent concentric layers, namely the layer 1 having six filaments 10 and located closest to the axis 0 and adjacent to the core A and the layer 2 having twelve filaments 20, located outside the layer 1 and adjacent to said layer 1.

The filaments 10 of the layer 1 have their axes $O_1$ arranged substantially on a circle $C_1$, shown in dashed line in the figure, the radius of this circle $C_1$ being marked $R_1$. The filaments 20 of the layer 2 have their axes $O_2$ arranged substantially on a circle $C_2$ of radius $R_2$. The circles $C_1$, $C_2$ have the same center 0. For clarity of the drawing, only one cord 10, one axis $O_1$, one cord 20 and one axis $O_2$ have been provided with reference numbers in the drawing. In each of the layers 1 or 2 the filaments 10 or 20 are wound in the same direction and with the same pitch, these pitches being referred to as $P_1$ in the case of the layer 1 and $P_2$ in the case of the layer 2.

The known definition of pitch represents the length, measured parallel to the axis of the assembly, at the end of which a filament having this pitch effects a complete revolution around the axis 0 of the assembly. If the axis 0 is intersected by two planes perpendicular to the axis 0 and arranged a length apart equal to the pitch of a filament 10 or 20 of one of the two layers 1 or 2, the axis of such cord 10 or 20 has, in these two planes, the same position on the two circles $C_1$ or $C_2$ corresponding to the layer 1 or 2 of the filament in question.

The layers 1 and 2 are adjacent since the filaments 10 of the layer 1 are in contact with the filaments 20 of the layer 2. The layers 1 and 2 have the same direction of winding, that is to say, all the filaments 10, 20 of the assembly of layers 1 and 2 are wound around the axis O either in S direction or in Z direction.

In accordance with the invention, the relation $$P_1 > P_2 > P_1 \times [1 - 2(R_2 - R_1)/R_2]$$

is satisfied, that is to say, in particular, that the outer layer 2 is laid with a shorter pitch than the inner layer 1.

In this example therefore "i" is equal to 1 and "j" is equal to 2.

The filaments A, 10, 20 may have identical or different diameters. In each layer 1, 2, the filaments 10, 20 of said layer have practically the same diameter as each other.

By way of example, the strand 100 has the following characteristics:

Diameter of the filament A serving as core: 0.195 mm;

Diameter of the six filaments 10 of the layer 1: 0.175 mm; radius of winding $R_1$ of said layer 1: 0.185 mm; pitch $P_1$ of said layer 1: 14.8 mm;

Diameter of the twelve filaments 20 of the layer 2: 0.175 mm; radius of winding $R_2$ of this layer 2: 0.36 mm; pitch $P_2$ of this layer 2: 7.6 mm.

The filaments 10 of the layer 1 and the filaments 20 of the layer 2 are wound around the axis 0 in Z direction. The filaments A, 10, 20 are all wires of steel covered with a layer of brass. This assembly is in accord with the invention since the two concentric layers 1 and 2 are wound in the same direction and $P_2$ (7.6 mm) is contained between $P_1$ (14.8 mm) and $P_1 \times [1 - 2 \times (R_2 - R_1)/R_2]$, which is equal to 0.4 mm.

Furthermore, the relationship $P_2 = P_1 \times (R_1/R_2)$ is substantially satisfied.

On the other hand, a known assembly is produced which has the same filaments as the assembly 100 but with the following arrangement:

it has a core formed of a filament of a diameter of 0.195 mm;

it has a first layer of six filaments of a diameter of 0.175 mm, this layer which is adjacent to the core having a pitch of 10 mm;

it has a second layer of 12 filaments arranged around the first layer and adjacent to said first layer, the winding pitch of said second layer being 10 mm.

The filaments of the first layer and the second layer are wound in Z direction.

This known assembly is not in accord with the invention since the two adjacent concentric layers have the same pitch of 10 mm.

The assembly 100 and the known assembly are each incorporated in the same manner in a rubber article in order to reinforce said article, which is vulcanized. This article is an endless belt and when the belt is arranged so as to form a cylinder of revolution, the assembly forms a helical winding having the same axis as said cylinder.

Thus two articles are obtained which are identical except for the reinforcement assemblies.

These two articles are subjected as follows to the same stresses. Each belt is turned around two rollers in such a manner that each elementary portion of the assembly is subjected to a tension of 188 N and experiences cycles of variation of curvature which cause it to change from an infinite radius of curvature to a radius of curvature of 40 mm, and this for eighteen million cycles. At the end of this stressing, the assemblies are removed in the same way from the articles by peeling, and the breaking force of the filaments of the second layer of the assemblies which have been subjected to stress is measured.

Furthermore, two belts identical to the previous ones are made, one reinforced with an assembly 100 and the other with a known assembly previously described, and these belts are peeled in the same manner as previously but this time without subjecting them to stressing and the breaking force of the filaments of the second layers of the assemblies is measured, these measurements thus serving as control, this breaking force being substantially the same for the assembly 100 as for the known assembly, namely about 130daN.

The two layers of these two assemblies are adjacent. The second layer, the outermost, is in contact only with the first layer; the examination of the breaking force of the filaments of this outer layer therefore clearly shows the effect of the invention.

It is found that the reduction in breaking force due to the stressing is as follows:

4.25% on the average for the known assemblies;

1.4% on the average for the assemblies in accordance with the invention.

The invention therefore unexpectedly makes it possible to avoid, to a large extent, reduction of the breaking force of the filaments of the assemblies. This reduction which is noted in the assemblies corresponds to the decrease in cross-section of the filaments as a result of their wear.

Furthermore, the wear of the filaments is representative of an intense working of the contact forces and of an increase in the tensile stresses within the metal which forms them. Thus the invention makes it possible very substantially to reduce the fatigue of the assemblies.

The assemblies in accordance with the invention can be used as such to reinforce articles, for instance in the form of cables formed of a single strand 100, or they can be combined with other assemblies, for instance with other assemblies according to the invention, in particular, in order to produce cables comprising a plurality of strands 100 which are twisted together.

Preferably, assemblies in accordance with the invention are used to produce carcass plies of pneumatic tires for heavy vehicles, industrial vehicles or construction vehicles.

The assemblies in accordance with the invention can be produced by known methods and apparatus, which are not described here for purposes of simplification.

The assemblies described above were produced with metal filaments but inorganic or organic materials or different materials could also be used.

Of course the invention is not limited to the embodiments which have been described above. Thus, for instance, the invention applies in the event that at least a part of the filaments of the assembly are not metallic, for instance if the core is of plastic and the other filaments of metal. Furthermore, the core can be formed of several filaments, this core being, for instance, formed of a layer which satisfies the aforesaid relationships with an adjacent layer. The invention also applies in the event that the assemblies comprise more than two layers, the number of layers, for instance, possibly reaching or even exceeding four, at least two of these layers satisfying the aforementioned relationship. Furthermore, the number of filaments and the pitches can be different from those described.

I claim:

1. An assembly of filaments for reinforcing a plastic or rubber article, this assembly, which comprises at least two layers of filaments, being characterized by the following features:

(a) it comprises at least two adjacent concentric layers of filaments around a common axis, each layer comprising at least two filaments, the layer of two adjacent layers which is closer to the axis being designated "i" and the layer of two adjacent layers which is further from the axis being designated "j"; in plane section perpendicular to said axis, in each of these two layers the filaments have their axes arranged substantially on a circle, the radii of these circles being designated $R_i$ in the case of the layer "i" and $R_j$ in the case of the layer "j"; in each of these two layers, the filaments are wound in the same direction and have the same pitch, these pitches being designated $P_i$ in the case of the layer "i" and $P_j$ in the case of the layer "j";

(b) the layers "i" and "j" have the same direction of winding;

(c) $R_i$, $R_j$, $P_i$, $P_j$ satisfy the relationship: $P_i > P_j > P_i \times [1 - 2(R_j - R_i)/R_j]$, $R_i$, $R_j$, $P_i$, $P_j$ being expressed with the same unit of length;

(d) the relationship $P_j = P_i \times (R_i/R_j)$ is substantially satisfied.

2. An assembly according to claim 1, characterized by the fact that the filaments of any layer are of the same diameter.

3. A complex assembly comprising at least two assemblies at least one of which is in accordance with claim 1.

4. A plastic or rubber article reinforced by at least one assembly, or complex assembly comprising at least two assemblies, which are in accordance with claim 1.

5. An article according to claim 4, characterized by the fact that it is a pneumatic tire.

6. A pneumatic tire according to claim 5, characterized by the fact that it is a pneumatic tire for heavy vehicles, industrial vehicles or construction vehicles, the assembly being used in order to produce at least one carcass ply.

* * * * *

UNITED STATES PATENT AND TRADEMARK OFFICE
CERTIFICATE OF CORRECTION

PATENT NO. : 5,074,345
DATED     : Dec. 24, 1991
INVENTOR(S) : Penant

It is certified that error appears in the above-identified patent and that said Letters Patent is hereby corrected as shown below:

Title page, Item 54, AND col. 1, line 1, delete "STEEL CORD CONSISTING OF".

Title page, delete the two lines following Item 75 and substitute therefor:

item [73] Assignee: Compagnie Generale des Etablissements Michelin-Michelin & Cie, Clermont-Ferrand, France.

item [21] Appl. No.: 406,429 item [22] Filed    : Sept. 12, 1989 item [30]    Foreign Application Priority Data
        Sept. 28, 1988    France        88/12779--.

Title page, 6th line of Abstract, "axis" should read --axes--.

Col. 1, line 21, "terms filaments" should read --term "filaments"--. Col. 2, line 38, "cord 10" should read --filament 10--; line 52, "cord" should read --filament--.

Signed and Sealed this

Fifteenth Day of June, 1993

Attest:

MICHAEL K. KIRK

Attesting Officer     Acting Commissioner of Patents and Trademarks